(12) United States Patent
Sato et al.

(10) Patent No.: US 7,821,506 B2
(45) Date of Patent: Oct. 26, 2010

(54) INPUT DEVICE

(75) Inventors: Tadamitsu Sato, Fukushima-ken (JP); Shuzo Ono, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 1080 days.

(21) Appl. No.: 11/518,722

(22) Filed: Sep. 11, 2006

(65) Prior Publication Data

US 2007/0063987 A1    Mar. 22, 2007

(30) Foreign Application Priority Data

Sep. 21, 2005    (JP) .............................. 2005-273940

(51) Int. Cl.
*G06F 3/41* (2006.01)
*G06F 3/45* (2006.01)

(52) U.S. Cl. .................... 345/174; 345/173; 178/18.01; 178/18.03; 178/18.05

(58) Field of Classification Search ......... 345/173–179, 345/104; 178/18.01, 18.02, 18.03, 18.05, 178/18.06, 18.07, 19.01, 19.03, 19.04
See application file for complete search history.

(56) References Cited

U.S. PATENT DOCUMENTS

| | | | | | |
|---|---|---|---|---|---|
| 5,305,017 | A | * | 4/1994 | Gerpheide | 345/174 |
| 5,453,760 | A | * | 9/1995 | Obuchi et al. | 345/173 |
| 5,463,388 | A | * | 10/1995 | Boie et al. | 341/33 |
| 5,815,141 | A | * | 9/1998 | Phares | 345/173 |
| 5,915,285 | A | * | 6/1999 | Sommer | 73/865.7 |
| 5,988,902 | A | * | 11/1999 | Holehan | 400/479.1 |
| 6,018,336 | A | * | 1/2000 | Akiyama et al. | 345/173 |
| 6,346,935 | B1 | | 2/2002 | Nakajima et al. | |
| 6,492,979 | B1 | * | 12/2002 | Kent et al. | 345/173 |
| 6,646,633 | B1 | * | 11/2003 | Nicolas | 345/173 |
| 7,331,245 | B2 | * | 2/2008 | Nishimura et al. | 73/862.46 |
| 7,339,577 | B2 | * | 3/2008 | Sato et al. | 345/173 |
| 2004/0189616 | A1 | * | 9/2004 | Gerpheide et al. | 345/174 |
| 2006/0279548 | A1 | * | 12/2006 | Geaghan | 345/173 |

FOREIGN PATENT DOCUMENTS

| | | |
|---|---|---|
| JP | 7-044306 | 2/1995 |
| JP | 3276079 | 2/2002 |

\* cited by examiner

*Primary Examiner*—Lun-yi Lao
(74) *Attorney, Agent, or Firm*—Brinks Hofer Gilson & Lione (57) ABSTRACT

An input device is provided. The input device includes a first position detection unit having a detection section which detects the absolute position of a predetermined operation tool in a predetermined region. A second position detection unit has a detection section, which detects contact or approach of the operation tool. An input control unit that controls an input operation on the basis of an input signal obtained from the first position detection unit or the second position detection unit, or a complex input signal combining an input signal obtained from the first position detection unit and an input signal obtained from the second position detection unit. The detection section of the second position detection unit is provided to partially or entirely enclose the outer circumference of the detection section of the first position detection unit.

19 Claims, 10 Drawing Sheets

INPUT DEVICE

This application claims the benefit of Japanese Patent Application 2005-273940 filed Sep. 21, 2005, which is hereby incorporated by reference.

BACKGROUND

1. Field

The present embodiments relate to an input device.

2. Related Art

In recent years, various input devices (interfaces) interposed between an electronic device, for example, a PC (personal computer) and a mobile phone, and a person who performs an input operation to the electronic device (hereinafter referred to as an "operator") have been proposed. Such input devices include, for example, a PC keyboard, a mouse, a touch pad type input device, and a numeric keypad used in a mobile phone. With the touch pad type input device, the absolute position input used in the handwriting input or the like and the relative position input used in the movement of a mouse pointer or the like can be easily performed in a limited area of an input screen. Thus, the touch pad type input device is frequently used in a mobile electronic device, such as a notebook PC, a PDA (Personal Digital Assistant), or a tablet PC.

A conventional touch pad type input device includes, for example, an X-detecting electrode having a plurality of linear electrodes extending in a horizontal direction. A common electrode has a plurality of linear electrodes, which are aligned between the respective linear electrodes of the X-detecting electrode on the surface formed with the X-detecting electrode and which extend parallel to the linear electrodes of the X-detecting electrode. A Y-detecting electrode has a plurality of linear electrodes extending in a vertical direction. Since a pulse voltage is applied to the linear electrodes of the common electrode, the linear electrodes of the X-detecting electrode and the Y-detecting electrode are both electrostatically coupled to the linear electrodes of the common electrode.

The surface formed with the X-detecting electrode and the common electrode and the surface formed with the Y-detecting electrode are superimposed on each other, with the two surfaces parallel to and not in contact with each other. Either one of the surface formed with the X-detecting electrode and the common electrode or the surface formed with the Y-detecting electrode is provided with a protection sheet, which forms an input screen for an operation tool, such as a finger and an input pen.

With the conventional touch pad type input device, when the protection sheet forming the input screen is traced with the operation tool, such as the finger or an input pen, the linear electrodes of the X-detecting electrode and the Y-detecting electrode corresponding to the traced region of the protection sheet change in charge capacity, and thus the absolute position (i.e., the absolute coordinate) of the operation tool can be detected.

In the conventional touch pad type input device, upon receipt of an input signal sent by an input mode switch separately provided to the conventional touch pad type input device or a host electronic device, a control unit of the electronic device (i.e., the host electronic device) provided with the touch pad type input device controls the switching of the input mode between the absolute position input used in the handwriting input or the like and the relative position input used in the movement of the mouse pointer or the like (see Japanese Patent No. 3276079 and Japanese Unexamined Patent Application Publication No. 7-44306).

Figure 9A:
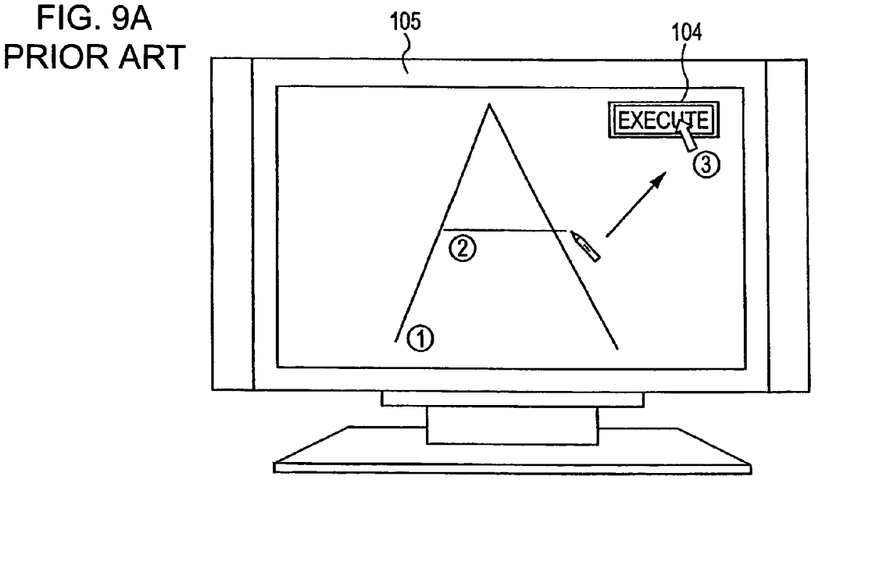
FIGS. 9A and 9B are plan views illustrating a display screen and a conventional input device.
Figure 9B:
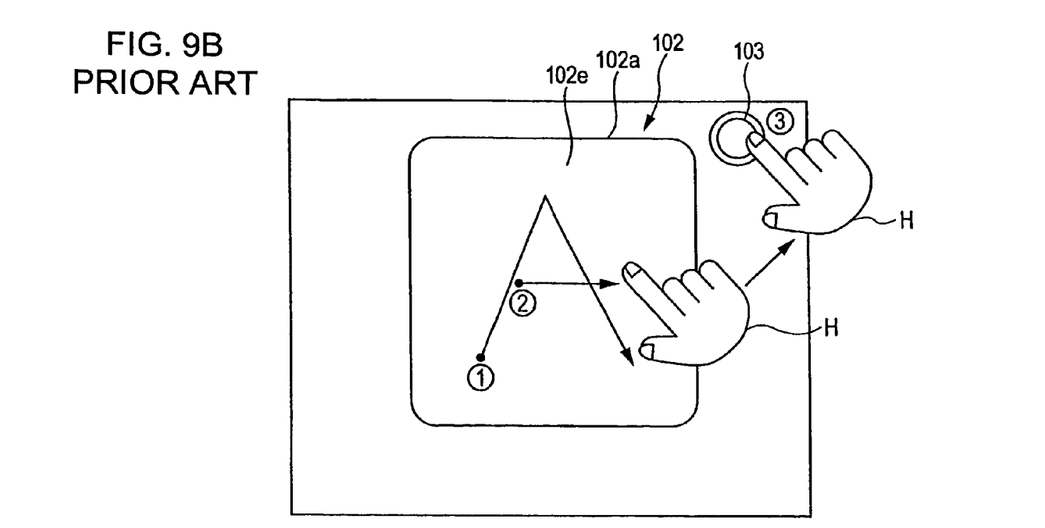
Figure 10A:
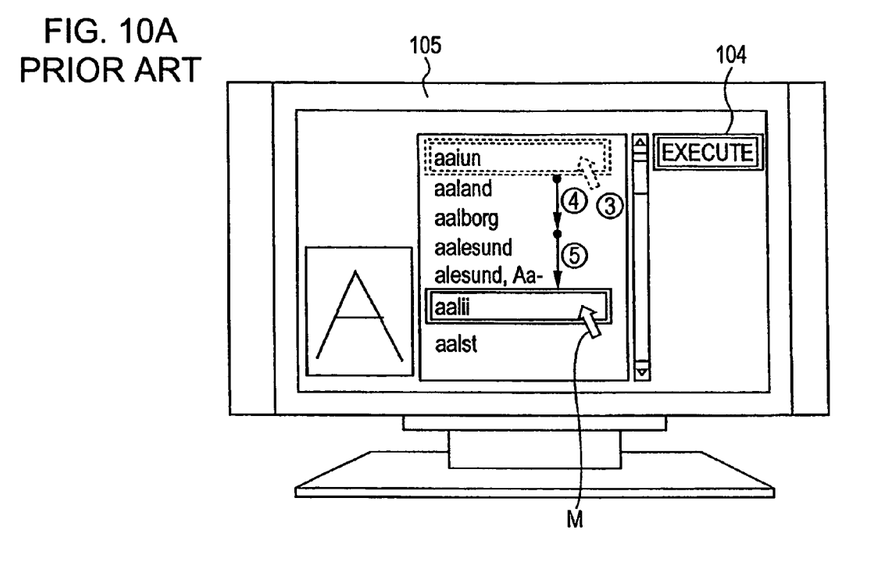
FIGS. 10A and 10B are plan views illustrating the display screen and the conventional input device.

For example, as illustrated in FIG. 9B, it is now assumed that a letter A has been input through the handwriting input in a detection section (i.e., a touch pad section) 102a of a touch pad type input device 101 by using an operation tool H, such as a finger of an operator. The letter A input through the handwriting input is displayed on a display screen (i.e., an operation screen) 105 as illustrated in FIG. 9A. As illustrated in FIG. 10A, to search an English word starting with the letter A displayed on the display screen 105, there arises a need to change the input mode of the detection section (i.e., the touch pad section) 102a from a handwriting input mode for inputting the absolute position to a search mode for selecting a desired English word by moving a mouse pointer M.

This changing (switching) of the input mode is carried out by operating, for example, a mechanical input mode switch 103 formed separately from a touch pad 102 as illustrated in FIG. 9B or an input mode switch button 104 displayed on the display screen 105 as illustrated in FIG. 9A. Upon operation of the mechanical input mode switch 103 or the input mode switch button 104, the touch pad type input device 101 sends an output signal for switching the input mode to a control unit (not illustrated) of a host electronic device.

The control unit (not illustrated) of the host electronic device performs processing in accordance with the signal input therein, and sends a mode switch command to the touch pad type input device 101. The touch pad type input device 101 then analyses the mode switch command and sends an according output signal to the control unit of the host electronic device. Thereby, the absolute position input mode is switched to the relative position input mode, or the displayed content of the display screen 105 illustrated in FIG. 9A is switched to the displayed content of the display screen 105 illustrated in FIG. 10A.

Figure 10B:
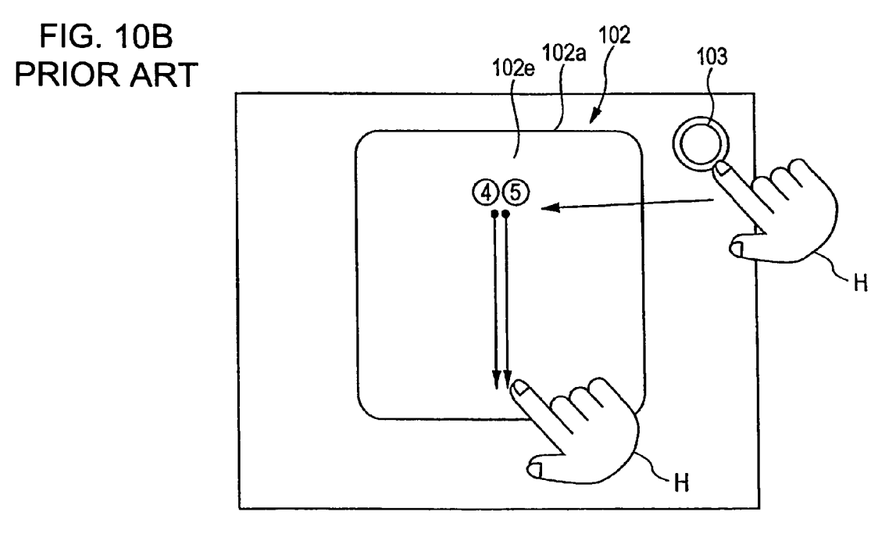

Accordingly, as illustrated in FIGS. 10A and 10B, the detection section (i.e., the touch pad section) 102a, in which the input mode has been changed from the absolute position input for the handwriting input or the like, can detect the relative position input for moving the mouse pointer M.

As the electronic device (i.e., the host electronic device) provided with the touch pad type input device 101 has been reduced in size, it may become physically difficult to separately provide the mechanical input mode switch 103 around the touch pad 102 due to the size limit of a housing of the host electronic device.

As the content displayed on the display screen 105 has become diverse and complex, a space for displaying the input mode switch button 104 displayed on the display screen 105 may not be secured.

During the operation of the above-described mechanical input mode switch 103 or input mode switch button 104, the input operation accompanying a long-distance movement needs to be consciously carried out from a touch pad input screen 102e to the mechanical input mode switch 103 or from the last input point on the display screen 105 to the input mode switch button 104. This hinders prompt switching of the input mode.

The above-described switching of the input mode is controlled by the control unit of the host electronic device provided with the input device, such as the touch pad type input device 101. Therefore, the control unit of the host electronic device, which is subject to burdens, is forced to be further burdened.

In addition, since the touch pad type input device 101 performs the input operation by detecting the change in the electrostatic capacitance, the common electrode needs to be constantly applied with the pulse voltage. Thus, unnecessary power consumption is increased during a time in which the touch pad type input device 101 is not in operation.

SUMMARY

To achieve the above objects, according to a present embodiment, an input device includes a first position detection unit, a second position detection unit, and an input control unit. The first position detection unit has a detection section that detects an absolute position of a predetermined operation tool in a predetermined region. The second position detection unit has a detection section that detects contact or approach of the operation tool. The input control unit controls an input operation on the basis of an input signal obtained from the first position detection unit or the second position detection unit, or a complex input signal combining an input signal obtained from the first position detection unit and an input signal obtained from the second position detection unit. The detection section of the second position detection unit is provided to partially or entirely enclose an outer circumference of the detection section of the first position detection unit.

Accordingly, the input device according to the present embodiments performs an input operation by detecting the absolute position in a predetermined region of a touch pad type input device provided in a notebook personal computer or the like.

The present embodiments are advantageous because they provide an input device capable of promptly switching the input mode, without being much influenced by the size of a housing of a host electronic device including the input device.

The present embodiments provide an input device capable of promptly switching the input mode, while keeping an operator of an operation tool almost unaware of the switching process.

Another advantage is that the input device is capable of switching the input mode, imposing little burden on a control unit of a host electronic device including the input device.

The input device is capable of suppressing unnecessary power consumption, while keeping an operator of an operation tool almost unaware of the process.

BRIEF DESCRIPTION OF THE PREFERRED EMBODIMENTS

Figure 1:
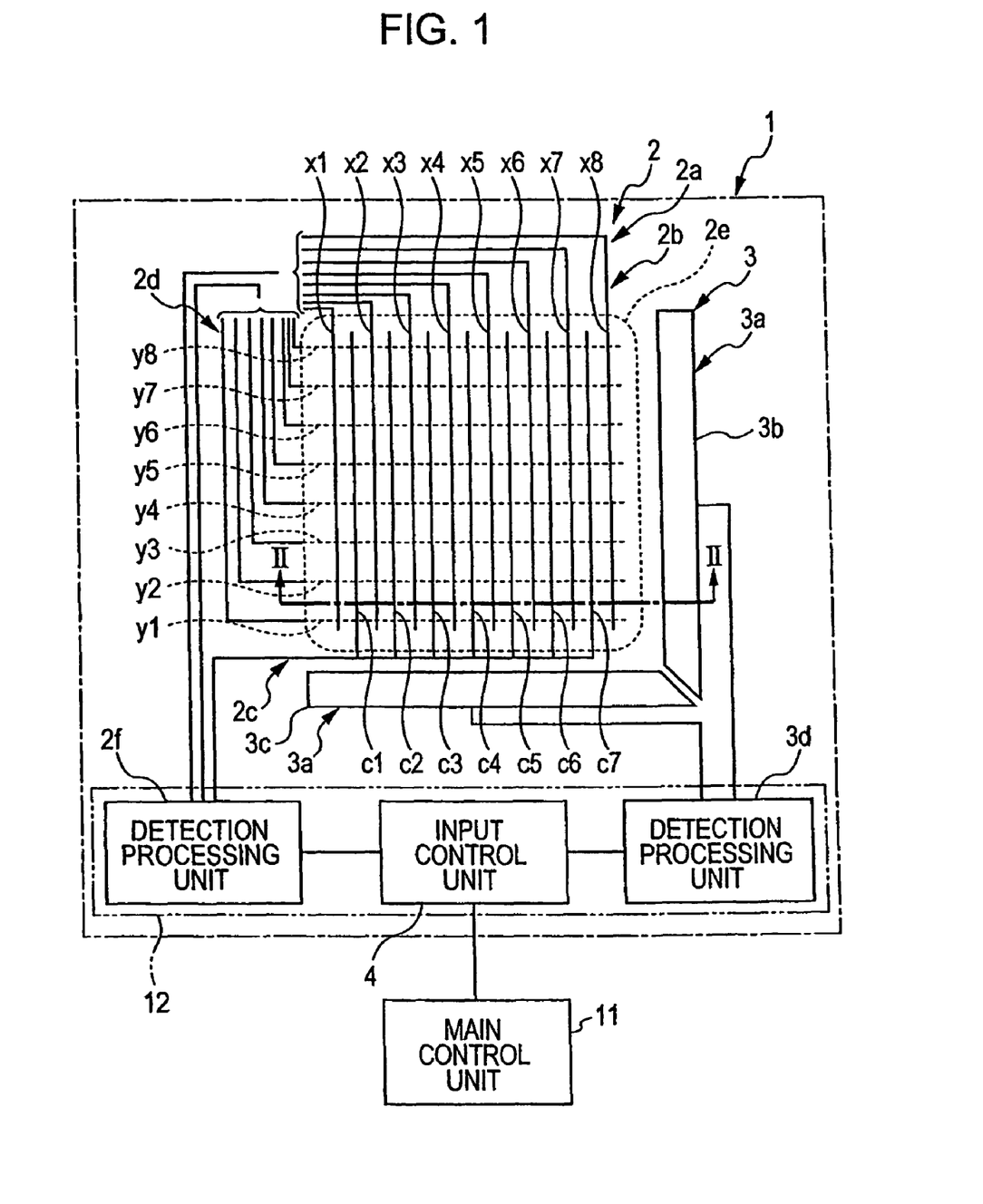
FIG. 1 is a plan view schematically illustrating an embodiment of an input device.
Figure 2:
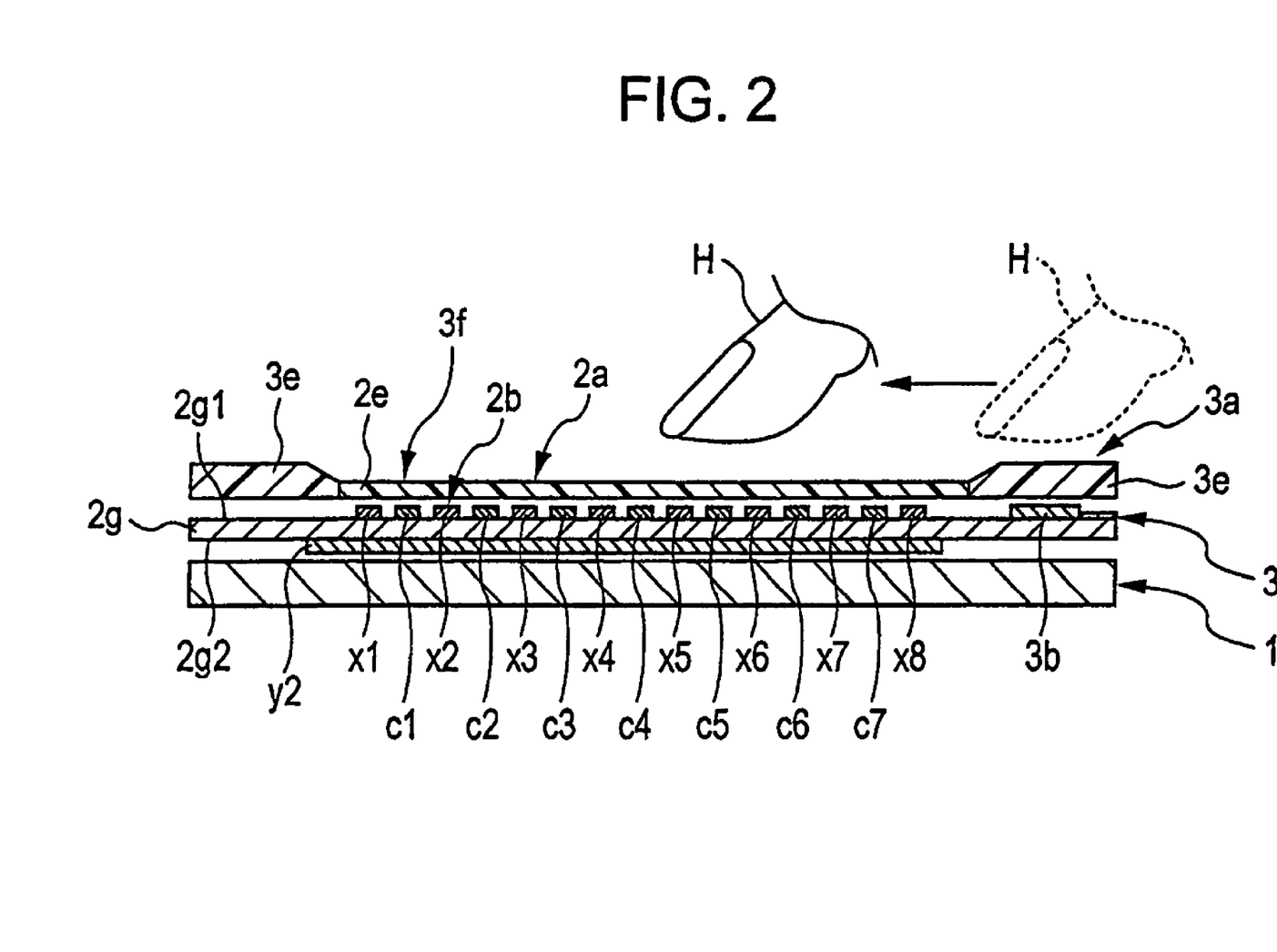
FIG. 2 is a cross-sectional view of a embodiment illustrated in FIG. 1 as taken along the II-II line.

A preferred embodiment of an input device will be described with reference to FIGS. 1 and 2. FIG. 1 schematically illustrates a embodiment of the input device, and FIG. 2 illustrates a cross-sectional view of an embodiment illustrated in FIG. 1 as taken along the II-II line.

As illustrated in FIG. 1, an input device 1 of the present embodiment includes a first position detection unit 2, a second position detection unit 3, and an input control unit 4.

The first position detection unit 2 includes a detection section 2a that detects, in a square-shaped region, the absolute position of a conductive operation tool H, such as a finger of an operator (not illustrated) or an input pen. A detection processing unit 2f processes a signal received from the detection section 2a. A protection sheet 2e forms an input screen for the operation tool H. The first position detection unit 2 is configured to detect a change in electrostatic capacitance.

The detection section 2a of the first position detection unit 2 includes a dielectric substrate 2g, an X-detecting electrode 2b, a common electrode 2c, and a Y-detecting electrode 2d.

The X-detecting electrode 2b includes a plurality of linear electrodes x1 to x8, which are aligned at regular intervals on a single surface on the substrate 2g (i.e., an upper surface 2g1 of the substrate 2g in FIG. 2), and which extend in one direction (i.e., the vertical direction in FIG. 1).The common electrode 2c includes a plurality of linear electrodes c1 to c7, which are aligned at regular intervals between the respective linear electrodes x1 to x8 of the X-detecting electrode on the surface formed with the X-detecting electrode 2b (i.e., the upper surface 2g1 of the substrate 2g in FIG. 2), and which extend in the extending direction of the linear electrodes x1 to x8 of the X-detecting electrode 2b (i.e., the vertical direction in FIG. 1). The common electrode 2c is configured such that the linear electrodes c1 to c7 thereof are applied with a pulse voltage.

The Y-detecting electrode 2d includes a plurality of linear electrodes y1 to y8, which are aligned at regular intervals on a surface (i.e., a lower surface 2g2 of the substrate 2g in FIG. 2) parallel to and different from the surface formed with the X-detecting electrode 2b and the common electrode 2c (i.e., the upper surface 2g1 of the substrate 2g in FIG. 2), and which extend perpendicularly (i.e., in the horizontal direction in FIG. 1) to the extending direction of the linear electrodes x1 to x8 of the X-detecting electrode 2b and the linear electrodes c1 to c7 of the common electrode 2c.

The detection processing unit 2f of the first position detection unit 2 is connected to the common electrode 2c, the X-detecting electrode 2b, and the Y-detecting electrode 2d. The detection processing unit 2f is configured to compare the pulse voltage applied to the common electrode 2c with a pulse voltage received from each of the linear electrodes x1 to x8 of the X-detecting electrode 2b and the linear electrodes y1 to y8 of the Y-detecting electrode 2d connected to the common electrode 2c through electrostatic coupling, and to detect a change in the pulse voltage. The detection processing unit 2f is further configured to send the input control unit 4 an input signal in accordance with the change in the pulse voltage.

The protection sheet 2e of the first position detection unit 2 is formed into a rectangular thin sheet from a dielectric member, such as a resin. As illustrated in FIG. 2, the protection sheet 2e is provided to protect either the surface formed with the X-detecting electrode 2b or the surface formed with the Y-detecting electrode 2d, which is closer to the external space (i.e., the surface formed with the X-detecting electrode 2b in the input device 1 according to the present embodiment).

In a preferred embodiment, the position detection unit 3 includes a detection section 3a, a detection processing unit 3d, and a protection sheet 3e. In this embodiment, the detection section 3a of the position detection unit 3 is formed from the linear electrodes x1 to x8 and y1 to y8 of the first position detection unit 2, and has a plurality of electrodes 3b and 3c, which are applied with a pulse voltage. The pulse voltage and the pulse number applied to the electrodes 3b and 3c of the second position detection unit 3 are set to be smaller than the pulse voltage and the pulse number applied to the first position detection unit 2.

The electrodes 3b and 3c of the position detection unit 3 are provided to enclose only the right side and the lower side of the outer circumference of the detection section 2a of the first position detection unit 2. These electrodes 3b and 3c are provided with a predetermined gap from the outer circumference of the detection section 2a of the first position detection unit 2. Further, each of the electrodes 3b and 3c are provided to form a single linear electrode, which encloses the entirety of either the right side or the lower side of the outer circumference.

The electrodes 3b and 3c are thus provided only at the right side and the lower side of the outer circumference of the detection section 2a of the first position detection unit 2, since the right side and the lower side are the sides at which a right-handed operator can easily move the operation tool H. To configure the input device 1 according to the present embodiment for a left-handed operator, it is preferable to provide the electrodes 3b and 3c only at the left side and the lower side of the outer circumference of the detection section 2a of the first position detection unit 2 (this configuration is not illustrated).

The detection processing unit 3d of the second position detection unit 3 is connected to the electrodes 3b and 3c of the second position detection unit 3. The detection processing unit 3d is configured to compare the pulse voltage applied to the electrodes 3b and 3c with a pulse voltage in which the pulse waveform has changed due to the approach of the operation tool H, and to detect the input operation with the operation tool H. The detection processing unit 3d is further configured to send the input control unit 4 an input signal in accordance with the change in the pulse voltage.

As illustrated in FIG. 2, the protection sheet 3e of the second position detection unit 3 is formed into a thin sheet from a dielectric member, such as a resin, and has a rectangular operation window 3f, which is formed into a size equal to the size of the outer circumference of the protection sheet 2e of the first position detection unit 2. Further, the protection sheet 3e of the second position detection unit 3 is provided to protect the surface formed with the electrode 3b and 3c (i.e., the surface formed with the X-detecting electrode 2b in the input device 1 according to the present embodiment). Alternatively, the protection sheet 3e of the second position detection unit 3 may not have the operation window 3f but may be integrated with the protection sheet 2e of the first position detection unit 2. In this case, it is preferable to mark, on a surface of the protection sheet 2e, an outline showing the region of the detection section 2a of the first position detection unit 2 so that the operator of the operation tool H can identify the position of the region of the detection section 2a of the first position detection unit 2.

As illustrated in FIG. 1, the input control unit 4 of the input device 1 is formed separately from a main control unit 11, which comprehensively controls an electronic device (i.e., a host electronic device not illustrated) including the input device 1 as one component. The input control unit 4 is configured to control the input operation on the basis of the input signal received from either the detection processing unit 2f of the first position detection unit 2 or the detection processing unit 3d of the second position detection unit 3. Upon detection of the operation tool H by the second position detection unit 3, the input control unit 4 performs control of changing the input mode used in the input of the first position detection unit 2.

The input mode herein refers to an input method in which the absolute position is input through the handwriting input or the like, or the relative position is input through the movement of a mouse pointer or the like. In a case in which a kana-letter/numeric keypad, which is used in a mobile phone, is displayed on the surface (for example, the input surface) of the protection sheet 2e of the first position detection unit 2, the input mode refers to such input modes as kana-letter input, katakana-letter input, and alphanumeric input.

The input mode may be changed not only by the simple detection or non-detection of the operation tool H by the second position detection unit 3, but also by a particular input method used in the input in the second position detection unit 3, such as tapping input including single-tapping and double-tapping and long-press input including one-second pressing.

It is more preferable to configure the input control unit 4 of the input device 1 so as to control not only the change of the input mode but also the change from a standby mode for reducing the power consumption to a normal mode for performing a normal detection operation. The input control unit 4 is configured to perform control of starting the operation of the first position detection unit 2 after the second position detection unit 3 has detected the operation tool H. In this case, it is further preferable to also perform control of interrupting the operation of the first position detection unit 2 during a time period in which the second position detection unit 3 detects the operation tool H after elapse of a predetermined time since completion of the detection of the operation tool H by the first position detection unit 2. For example, the standby mode may be started after elapse of three minutes since the completion of the detection of the operation tool H by the first position detection unit 2, and the standby mode may be changed (for example, returned) to the normal mode after the detection of the operation tool H by the second position detection unit 3.

The input control unit 4 is further configured to control the input operation on the basis of not only the individual input signal obtained from the detection processing unit 2f of the first position detection unit 2 or the detection processing unit 3d of the second position detection unit 3, but also a complex input signal combining the input signal obtained from the first position detection unit 2 and the input signal obtained from the second position detection unit 3. The input control unit 4 is configured to control of changing the input mode to a "kana-letter input mode," when a three o'clock (i.e., the right side) portion of the detection section 2a of the first position detection unit 2 detects the operation tool H after the detection section 3a of the second position detection unit 3, which is provided at the right side of the outer circumference of the detection section 2a of the first position detection unit 2, has detected the operation tool H.

The input control unit 4 is configured to control of changing the input mode to a "Roman-letter input mode," when a six o'clock (for example, the lower side) portion of the detection section 2a of the first position detection unit 2 detects the operation tool H after the detection section 3a of the second position detection unit 3, which is provided at the lower side of the outer circumference of the detection section 2a of the first position detection unit 2, has detected the operation tool H. By way of example, the input control unit 4 is configured to control of changing the input mode to a predetermined input mode selected from a plurality of input modes used in the input of the first position detection unit 2, on the basis of the complex input signal combining the input signal obtained from the detection section 3a of the second position detection unit 3 and the subsequent input signal obtained through the detection of the particular absolute position of the operation tool H by the detection section 2a of the first position detection unit 2.

As illustrated in FIG. 1, it is preferable that the detection processing unit 2f of the first position detection unit 2, the detection processing unit 3d of the second position detection unit 3, and the input control unit 4 are integrated into an application specific integrated circuit (ASIC) 12.

Figure 3:
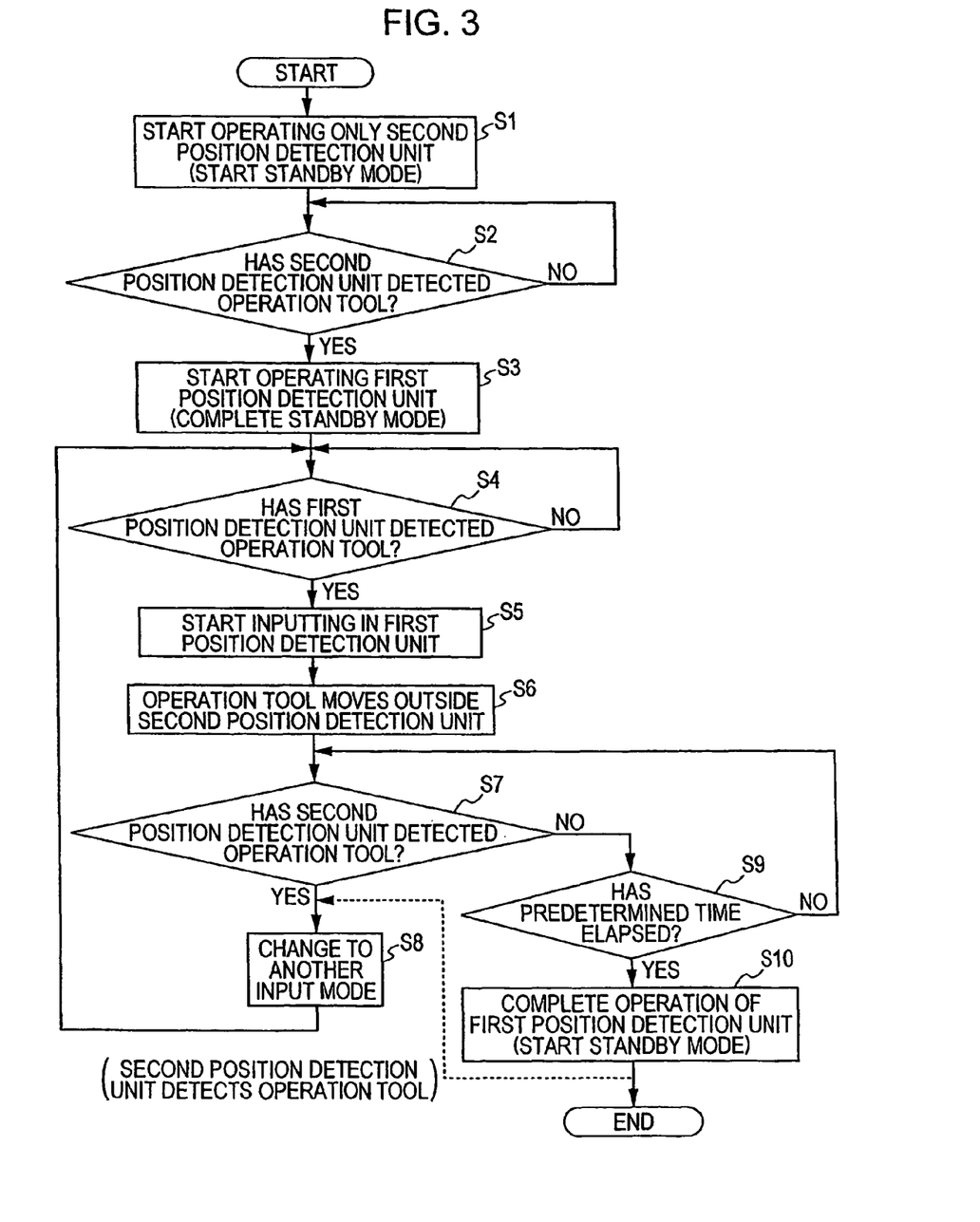
FIG. 3 is a flowchart illustrating a control flow of an input control unit provided in the input device according to a present embodiment.

With reference to FIGS. 3 to 8, the operation of the input device 1 according to the present embodiment will now be described. FIG. 3 illustrates a control flow of the input control unit 4 included in the input device 1 according to the present embodiment. FIGS. 4A and 4B illustrate a state in which the handwriting input (i.e., the absolute position input) is performed to the first position detection unit 2 included in the input device 1 according to the present embodiment. FIGS. 5A and 5B illustrate a state in which the second position detection unit 3 included in the input device 1 according to the present embodiment has detected the operation tool H. FIGS. 6A and 6B illustrate a state in which an operation of moving the mouse pointer M (i.e., the relative position input) is performed to the first position detection unit 2 included in the input device 1 according to the present embodiment.

The input device 1 according to the present embodiment includes the first position detection unit 2 having a square-shaped detection region (i.e., the detection section 2a). The second position detection unit 3 has the detection section 3a provided to enclose the right side and the lower side of the outer circumference of the detection section 2a of the first position detection unit 2. The input control unit 4 controls the input operation on the basis of the input signal obtained from the first position detection unit 2 or the second position detection unit 3, or the complex input signal combining the input signal obtained from the first position detection unit 2 and the input signal obtained from the second position detection unit 3. Therefore, the second position detection unit 3 can detect the operation tool H before the first position detection unit 2 first detects the operation tool H.

When the input operation is performed to the first position detection unit 2 by using the operation tool H, the operation tool H inevitably approaches the detection section 3a of the second position detection unit 3 provided at the outer circumference of the first position detection unit 2. Accordingly, the operator can perform the input operation to the second position detection unit 3 before performing the input operation to the first position detection unit 2, while being almost unaware of the input process.

The first position detection unit 2 is configured such that the X-detecting electrode 2b, which is formed on the surface formed with the common electrode 2c, is superimposed on and perpendicular to the Y-detecting electrode 2d. The first position detection unit 2 is further configured to cause the change in the electrostatic capacitance of the X-detecting electrode 2b or the Y-detecting electrode 2d due to a change in the area and distance between the X-detecting electrode 2b or the Y-detecting electrode 2d and the operation tool H, and thus to detect the contact or approach of the operation tool H to the protection sheet 2e. Accordingly, the first position detection unit 2 can be easily manufactured at low cost.

The second position detection unit 3 includes the elongated electrodes 3b and 3c applied with the pulse voltage, and is configured to cause the change in the electrostatic capacitance of the electrodes 3b and 3c due to a change in the area and distance between the electrodes 3b and 3c and the operation tool H, and thus to detect the contact or approach of the operation tool H to the protection sheet 3e. Accordingly, similarly to the first position detection unit 2, the second position detection unit 3 can be easily manufactured at low cost. Further, since the second position detection unit 3 includes the detection section 3a, which includes the electrodes 3b and 3c for detecting the contact or approach of the operation tool H, the second position detection unit 3 can be easily formed into a thin and desired shape. Accordingly, unlike the mechanical switch which requires a certain amount of stroke in the pressing direction and a certain area to be pressed, the second position detection unit 3 hardly depends on the size or shape of a housing of the host electronic device including the input device 1.

In the detection section 3a of the second position detection unit 3, and among the plurality of linear electrodes x1 to x8 and y1 to y8 used in the detection section 2a of the first position detection unit 2, the linear electrodes x8 and y1 which are most adjacent to the outer circumference may be used as the electrodes 3b and 3c of the detection section 3a of the second position detection unit 3. According to the present embodiment, if the electrodes x8 and y1 of the detection section 2a of the first position detection unit 2 are formed separately and independently from the electrodes 3b and 3c of the detection section 3a of the second position detection unit 3, the detection region of the detection section 2a of the first position detection unit 2 can be prevented from being reduced. Further, if the detection section 3a of the second position detection unit 3 is formed separately from the detection section 2a of the first position detection unit 2, an operation pattern of the input device 1 can be formed in which the first position detection unit 2 temporarily stops the detection of the operation tool H and thus only the second position detection unit 3 performs the detection of the operation tool H. This contributes to the reduction of the power consumption of the input device 1.

Further, to reduce the power consumption of the input device 1, in the input device 1 according to the present embodiment, the pulse voltage and the pulse number applied to the detection section 3a of the second position detection unit 3 are set to be smaller than the pulse voltage and the pulse number applied to the first position detection unit 2 so that the position detection frequency of the second position detection unit 3 is smaller than the position detection frequency of the first position detection unit 2. Thereby, the power consumption of the second position detection unit 3 can be made lower than the power consumption of the first position detection unit 2. The second position detection unit 3 is not required to have high input accuracy (i.e., the detection of the absolute position), compared with the first position detection unit 2. Therefore, the decrease in the position detection frequency of the second position detection unit 3 hardly deteriorates the convenience for the operator.

The electrodes 3b and 3c used for the detection section 3a of the second position detection unit 3 are provided to enclose the right side and the lower side of the outer circumference of the detection section 2a of the first position detection unit 2 such that each of the electrodes 3b and 3c forms a single linear electrode for enclosing the respective side as illustrated in FIG. 1. For example, each of the electrodes 3b and 3c are not provided to enclose the respective side in the form of spot electrodes intermittently aligned in a line. Accordingly, the second position detection unit 3 can detect the operation tool H, which has moved from the right side and the lower side of the outer circumference of the detection section 2a of the first position detection unit 2 toward the region of the detection section 2a of the first position detection unit 2.

Further, the electrodes 3b and 3c of the second position detection unit 3 are provided with the predetermined gap from the outer circumference of the detection section 2a of the first position detection unit 2. Thus, the first position detection unit 2 can be prevented from erroneously detecting the operation tool H, when the operation tool H is moved to contact or approach only the second position detection unit 3.

As described above, the detection section 3a of the second position detection unit 3 is provided only at the right side and the lower side of the outer circumference of the detection section 2a of the first position detection unit 2 as illustrated in FIG. 1, in consideration of the convenience (i.e., usability) in accordance with the hand dominance of the operator of the operation tool H. Therefore, the convenience for the operator is improved.

Since the detection section 3a of the second position detection unit 3 is not provided at the sides at which the operation tool H is not easily operated (for example, at the left side and the upper side of the outer circumference in the present embodiment), the unnecessary power consumption can be reduced. Unlike the input device 1 according to the present embodiment designed for right-handed operators, in the input device 1 according to another embodiment designed for left-handed operators, the detection section 3a of the second position detection unit 3 is provided only at the left side and the lower side of the outer circumference so that an effect similar to the effect obtained by the input device 1 according to the present embodiment can be obtained.

The input device 1 according to the present embodiment is configured such that the detection section 3a of the second position detection unit 3 detects the operation tool H before the detection section 2a of the first position detection unit 2 detects the operation tool H. The input control unit 4 of the input device 1 is configured to control both the first position detection unit 2 and the second position detection unit 3. With reference to FIG. 3, a specific control flow will now be described.

During operation, the input control unit 4 performs control of operating only the second position detection unit 3 (Step S1). If the second position detection unit 3 has detected the operation tool H (YES in Step S2), the input control unit 4 performs control of starting the operation of the first position detection unit 2 (Step S3). The detection start time of the first position detection unit 2 can be most delayed. Accordingly, it is possible to reduce the power necessary during the standby time of the first position detection unit 2, and thus to reduce the power consumption of the first position detection unit 2.

Figure 4A:
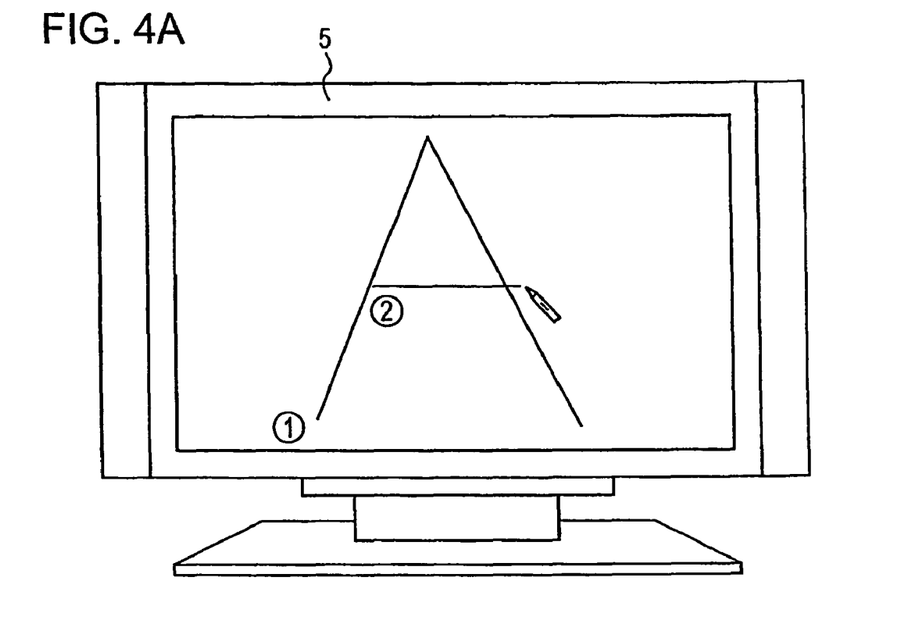
FIGS. 4A and 4B are plan views illustrating a display screen and the input device according to a present embodiment.
Figure 4B:
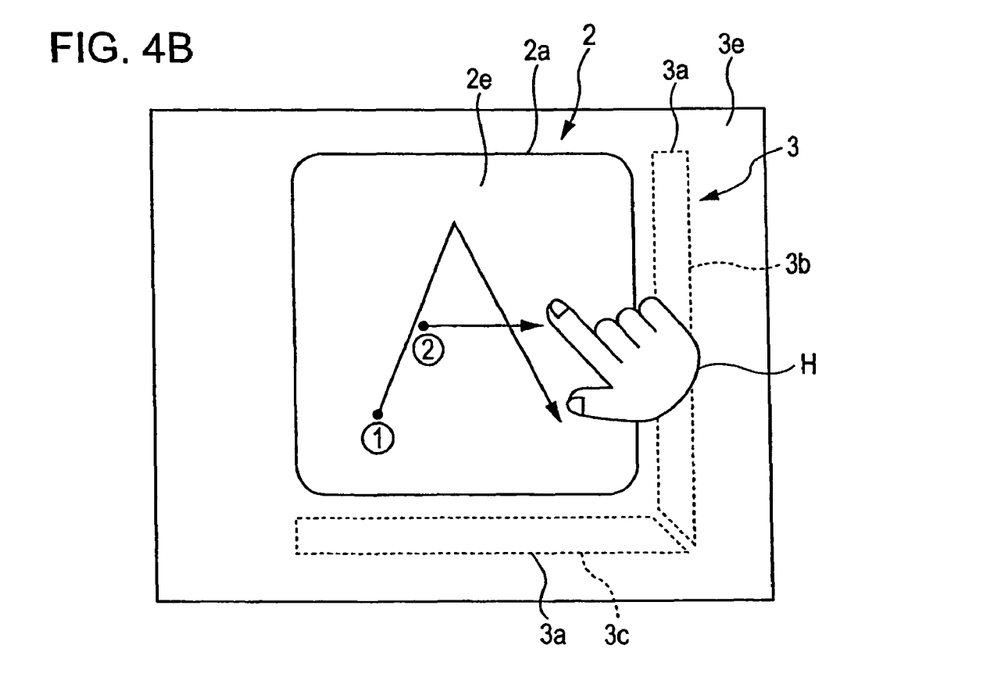

When the first position detection unit 2 has detected the operation tool H, such as the finger or the input pen (YES in Step S4), the input operation with the first position detection unit 2 starts (Step S5). For example, as illustrated in FIGS. 4A and 4B, in a case in which the input mode of the first position detection unit 2 is the absolute position input used in the handwriting input or the like, when a letter A is input in the detection section 2a of the first position detection unit 2, an input signal is subjected to the processing and the control by the input control unit 4, and the letter A is displayed on a display screen 5.

When the input mode of the first position detection unit 2 is the relative position input used in the movement of the mouse pointer M or the like, the letter A cannot be displayed on the display screen 5.

Figure 5A:
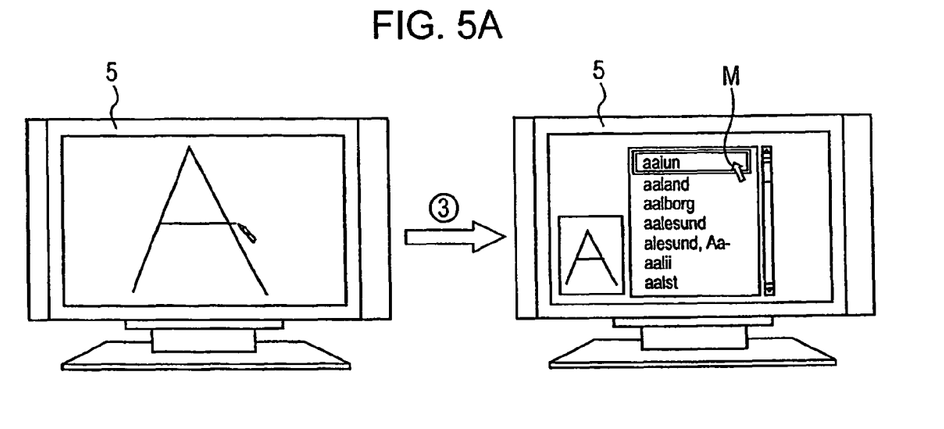
FIGS. 5A and 5B are plan views illustrating the display screen and the input device according to a present embodiment.
Figure 5B:
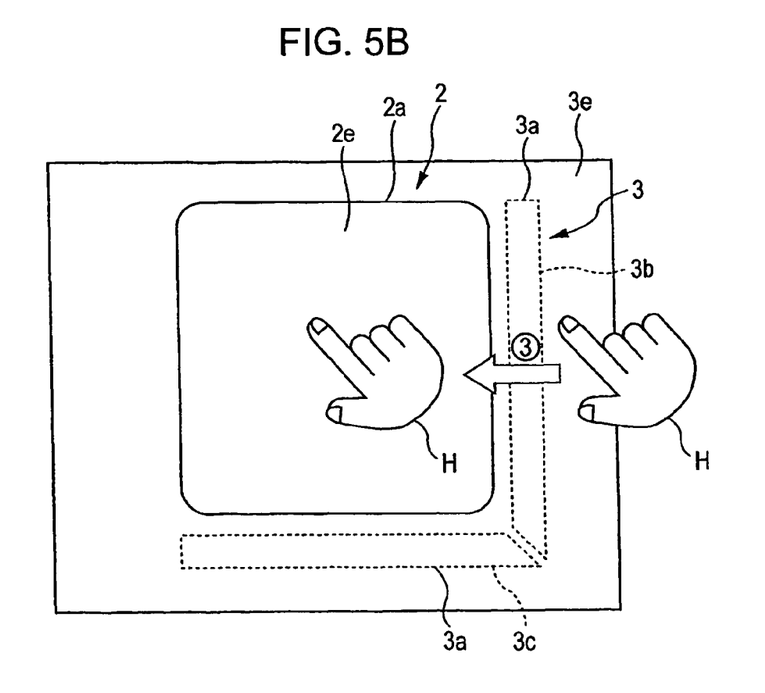

As illustrated in FIG. 3, the operation tool H moves outside the detection section 3a of the second position detection unit 3, which is provided at the right side and the lower side of the outer circumference of the detection section 2a of the first position detection unit 2 (Step S6). As illustrated in FIGS. 5A and 5B, when the operation tool H moves again to the detection region of the detection section 2a of the first position detection unit 2, the detection section 2a of the first position detection unit 2 detects the operation tool H during the movement (YES in Step S7). Through the control by the input control unit 4, the input mode is changed to search an English word on the basis of the input letter A or to shift from the absolute position input to the relative position input (Step S8).

When the operation tool H is moved from the outer circumference of the detection section 2a of the first position detection unit 2 into the region of the detection section 2a of the first position detection unit 2, the input mode of the first position detection unit 2 can be promptly switched, while keeping the operator almost unaware of the switching process.

Figure 6A:
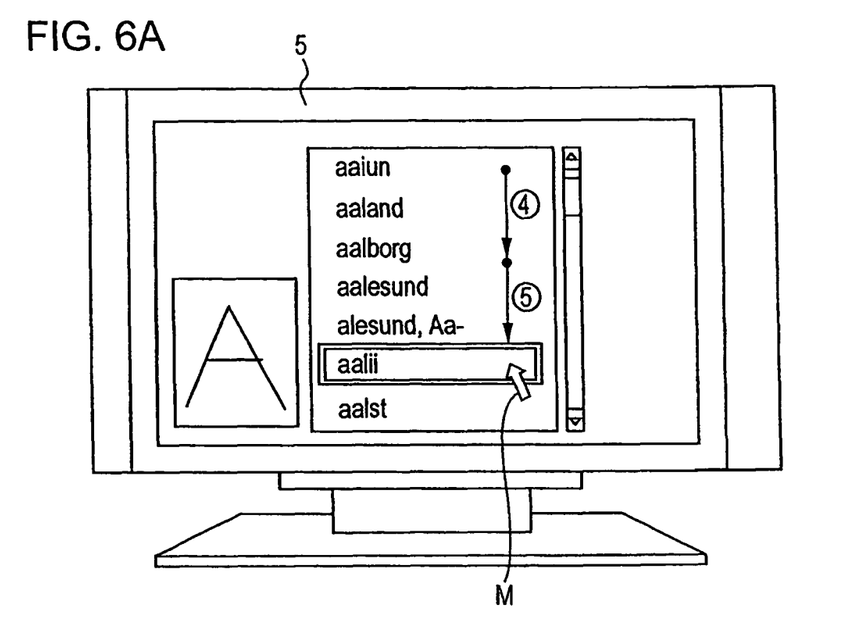
FIGS. 6A and 6B are plan views illustrating the display screen and the input device according to a present embodiment, e.
Figure 6B:
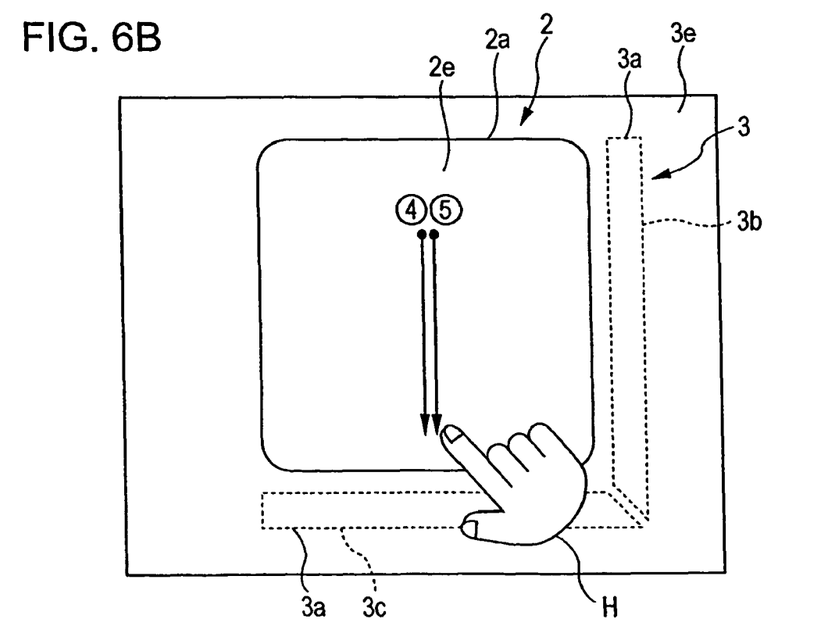

When the input mode of the first position detection unit 2 is switched from the absolute position input mode to the relative position input mode (Step S8), the first position detection unit 2 starts the input operation through the detection of the relative position (Steps S4 and S5). For example, as illustrated in FIGS. 6A and 6B, if the operation tool H, such as the finger, which is in contact with or close to the detection section 2a of the first position detection unit 2 is slid twice in the vertical directions at one location, the input signal is subjected to the processing and the control by the input control unit 4. The mouse pointer M displayed on the display screen 5 is moved by a distance obtained by adding a vector obtained by the two vertically sliding movements. If the input mode of the first position detection unit 2 is the absolute position input used in the handwriting input or the like, the mouse pointer M displayed on the display screen 5 constantly moves on one same location and cannot be moved to a desired location on the display screen 5.

As illustrated in FIG. 3, after the first position detection unit 2 has detected the operation tool H and then the operation tool H has moved outside the detection section 3a of the second position detection unit 3 (Step S6), if the second position detection unit 3 does not detect the operation tool H even after the elapse of the predetermined time (NO in Step S7 and YES in Step S9), the input control device 4 performs the control (for example, the control to start the standby mode) to temporarily stop (complete) the operation of the first position detection unit 2 during the time period in which the second position detection unit 3 detects the operation tool H (Step S10). Thus, the detection operation by the first position detection unit 2 can be performed only when necessary. Accordingly, the power consumption of the first position detection unit 2 can be reduced. Even if the first position detection unit 2 starts the standby mode (Step S10), when the second position detection unit 3 detects the operation tool H, another switching operation of the input mode can be performed, such as the switching from the standby mode to the normal mode and the switching from the absolute position input mode to the relative position input mode (Step S8).

When the input mode needs to be switched to perform the input operation to the first position detection unit 2, the input mode of the first position detection unit 2 can be switched only by moving the operation tool H outside the detection region of the first position detection unit 2 and then moving the operation tool H back to the detection region of the first position detection unit 2. This makes the switching operation of the input mode prompter than the conventional input mode switching method (see FIGS. 9A and 9B) of operating the mechanical input mode switch 103 formed separately from the first position detection unit (i.e., the touch pad) 102 or the input mode switch button 104 displayed on the display screen 105.

The input mode may be changed by a particular input method for inputting in the second position detection unit 3, such as the tapping input including the single-tapping and the double-tapping and the long-press input including the one-second pressing which are performed with the operation tool H. With this configuration, the input mode can be changed to a particular input mode selected from the plurality of input modes by moving, by a small moving distance, the operation tool H located within the region of the detection section 2a of the first position detection unit 2 to the outer circumference of the detection section 2a of the first position detection unit 2, and then performing the particular input method. Accordingly, the input mode of the first position detection unit 2 can be switched more promptly than the conventional method.

As another method of changing the input mode, as described above, such control may be performed to change the input mode to the particular input mode selected from the plurality of input modes used in input in the first position detection unit 2, on the basis of the complex input signal combining the input signal obtained from the detection section 3a of the second position detection unit 3 and the subsequent input signal obtained through the detection of the particular absolute position of the operation tool H by the detection section 2a of the first position detection unit 2. With this method, when the operation tool H is moved from the outer circumference of the detection section 2a of the first position detection unit 2 into the region of the detection section 2a of the first position detection unit 2, the input mode can be switched to the predetermined input mode selected from the plurality of input modes of the first position detection unit 2 in accordance with the side from which the operation tool H has moved. For example, when the operation tool H has been moved from the right side of the outer circumference of the detection section 2a of the first position detection unit 2 into the region of the detection section 2a of the first position detection unit 2, the input mode may be switched to the "kana-letter input mode."

When the operation tool H has been moved from the lower side of the outer circumference of the detection section 2a of the first position detection unit 2 into the region of the detection section 2a of the first position detection unit 2, for example, the input mode may be switched to the "Roman-letter input mode."

As illustrated in FIG. 1, the input control unit 4 of the input device 1 according to the present embodiment is formed separately from the main control unit 11 of the host electronic device including the input device 1 according to the present embodiment. Therefore, the input control unit 4 of the input device 1 performs such control operations of the input device 1 as reception of an input mode switch signal, creation and transmission of a mode switch command, and analysis of the mode switch command, which are usually performed by the main control unit 11 of the host electronic device. The input control unit 4 sends the main control unit 11 of the host electronic device only those signals ultimately required by the control unit of the host electronic device. Accordingly, the burden imposed on the main control unit 11 of the host electronic device can be reduced.

As illustrated in FIG. 1, if the detection processing unit 2f of the first position detection unit 2, the detection processing unit 3d of the second position detection unit 3, and the input control unit 4 form the ASIC (application specific integrated circuit) 12, it is possible to reduce the size and weight of the circuit involving the detection processing unit 2f of the first position detection unit 2, the detection processing unit 3d of the second position detection unit 3, and the input control unit 4.

Even if the size of the housing of the host electronic device including the input device 1 is reduced, the input device 1 according to the present embodiment can switch the input mode, while keeping the operator almost unaware of the switching process and also imposing little burden on the control unit of the host electronic device. Thus, the input device 1 has the effect of making the switching of the input mode used by the first position detection unit 2 prompter and easier.

The present preferred embodiments are not limited to the above-described embodiment but may be modified in various ways where necessary.

For example, the input device need not be configured such that the detection section 3a of the second position detection unit 3 is provided to enclose only one portion (i.e., the right side and the lower side) of the outer circumference of the detection section 2a of the first position detection unit 2, as in the input device 1 according to the present embodiment illustrated in FIG. 1.

Figure 7:
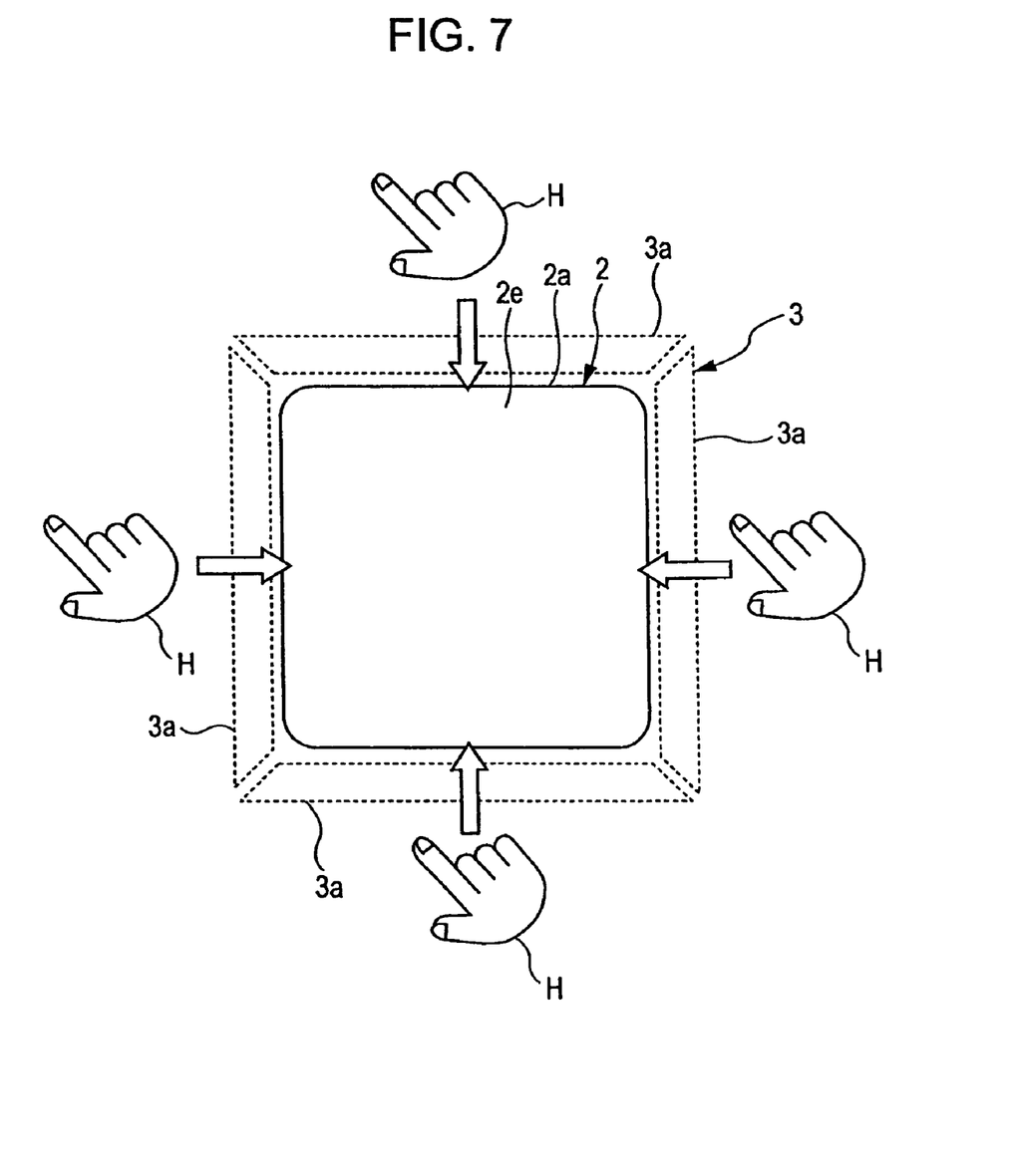
FIG. 7 is a plan view illustrating a state in which detection sections of the second position detection unit are provided at all sides of the outer circumference of the first position detection unit included in the input device according to a present embodiment.

According to another embodiment, the detection section 3a of the second position detection unit 3 may be provided to enclose all of the respective sides of the outer circumference of the detection section 2a of the first position detection unit 2, as illustrated in FIG. 7. In this configuration, the second position detection unit 3 can distinguish and detect from which side of the detection section 2a of the first position detection unit 2 the operation tool H has moved to the detection section 2a of the first position detection unit 2.

The first position detection unit 2 needs to include the detection section 2a for detecting the absolute position of the predetermined operation tool H in a predetermined region. Therefore, the first position detection unit 2 may not include the touch pad type detection section (for example, the input section) but may include such a detection section (for example, an input section) as input keys of a mobile phone 6 provided with predetermined operation buttons (for example, operation buttons numbered 1 to 9) within a predetermined region, as illustrated in FIG. 8.

In the input device 1 according to a present embodiment, the detection section 3a of the second position detection unit 3 is provided only at the right side and the lower side of the outer circumference of the detection section 2a of the first position detection unit 2. Alternatively, when the detection section 2a of the first position detection unit 2 is formed to be vertically long or horizontally long, it is preferable to provide the detection section 3a of the second position detection unit 3 to enclose only the left side and the right side or the upper side and the lower side of the outer circumference of the detection section 2a of the first position detection unit 2, respectively. According to this configuration, the detection section 3a of the second position detection unit 3 is not provided at the sides at which the operation tool H is not easily operated. Accordingly, the unnecessary power consumption can be reduced.

Figure 8:
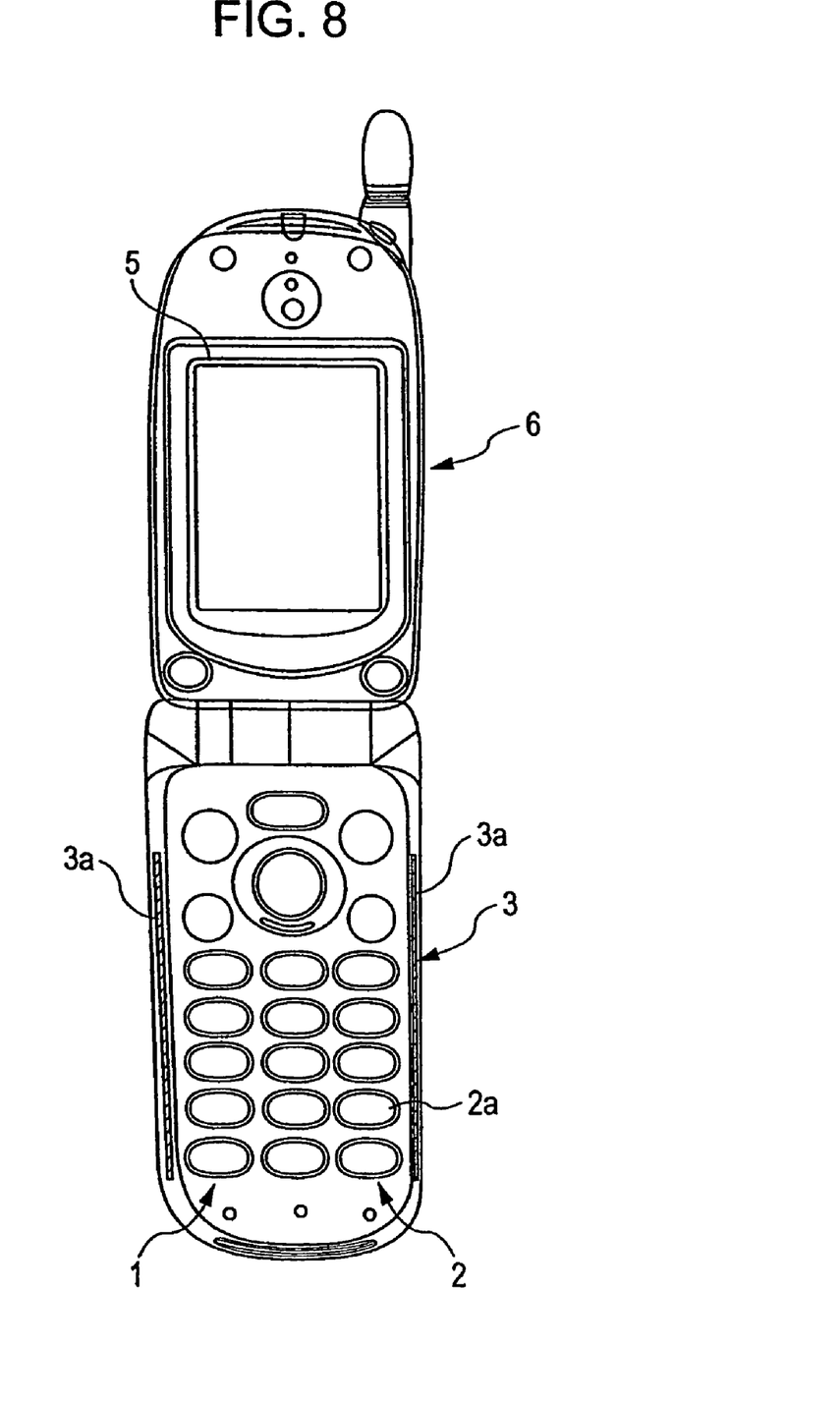
FIG. 8 is a plan view illustrating a mobile phone provided with an input device according to a present embodiment.

For example, as illustrated in FIG. 8, to provide the input device 1 to the host electronic device, such as the mobile phone 6, in which the longitudinal direction of the region formed with the detection section 2a (for example, the input keys) of the first position detection unit 2 is the up and down (for example, vertical) direction, the detection section 3a of the second position detection unit 3 is provided only at the right side and the left side (i.e., in the lateral direction) of the detection section 2a of the first position detection unit 2, at which the operation tool H is easily moved. Further, the detection section 3a of the second position detection unit 3 is not provided at the upper side and the lower side (for example, in the longitudinal direction) of the detection section 2a of the first position detection unit 2, at which the operation tool H is not easily moved. Accordingly, the unnecessary power consumption can be reduced.

When the longitudinal direction of the detection section 2a of the first position detection unit 2 is the left and right (for example, horizontal) direction, the detection section 3a of the second position detection unit 3 is provided only at the upper side and the lower side (for example, at the outer circumference of the detection section 2a in the lateral direction) of the detection section 2a of the first position detection unit 2, at which the operation tool H is easily moved. Accordingly, the unnecessary power consumption can be reduced.

If the input device 1 according to a present embodiment is provided to a mobile terminal, such as the mobile phone 6 illustrated in FIG. 8, to which the input operation is frequently performed with one hand, it is possible to reduce the number of key inputs in the mobile terminal and thus to make the input operation smooth.

What is claimed is:

1. An input device comprising:
   first position detection unit having a detection section that detects an absolute position of a predetermined operation tool in a predetermined region;
   second position detection unit having a detection section that detects whether an operator has performed contact or approach with the operation tool without detecting the absolute position of the operation tool;
   input control unit that controls an input operation on the basis of an input signal obtained from the first position detection unit or the second position detection unit, or a complex input signal combining an input signal combining an input signal obtained from the first position detection unit and an input signal obtained from the second position detection unit;
   a first detection processing unit; and
   a second detection processing unit,
   wherein the detection section of the second position detection unit is provided to at least partially enclose an outer circumference of the detection section of the first position detection unit,
   wherein the first detection processing unit and the second detection processing unit are separate from each other,
   wherein the first detection processing unit operates the first position detection unit, and the second detection processing unit operates the second position detection unit,
   wherein the input control unit controls the first detection processing unit and the second processing detection unit,
   wherein when the input operation is performed to the first position detection unit, the operation tool approaches the detection section of the second position detection unit provided at the outer circumference of the first position detection unit.

2. The input device as described in claim 1,
   wherein the detection section of the second position detection unit is separate from the detection section of the first position detection unit.

3. The input device as described in claim 1,
   wherein the second position detection unit is configured to detect the operation tool within a predetermined time at a lower position detection frequency than a position detection frequency of the first position detection unit.

4. The input device as described in claim 1,
   wherein the detection section of the second position detection unit is linearly formed.

5. The input device as described in claim 1,
   wherein the detection section of the second position detection unit is provided with a predetermined gap from the outer circumference of the detection section of the first position detection unit.

6. The input device as described in claim 1,
   wherein the detection section of the second position detection unit is provided in accordance with respective sides of the outer circumference of the detection section of the first position detection unit.

7. The input device as described in claim 6,
   wherein the detection section of the second position detection unit is provided to enclose only the left side and the right side or only the upper side and the lower side of the outer circumference of the detection section of the first position detection unit.

8. The input device as described in claim 1,
   wherein the detection section of the second position detection unit is provided to enclose only the right or left side and the lower side of the outer circumference of the detection section of the first position detection unit.

9. The input device as described in claim 1, wherein the second position detection unit further includes:
   the detection section having rectangular electrodes applied with a pulse voltage,
   detection processing unit that detects a change in the pulse voltage applied to the electrodes, and that sends the input control unit an input signal in accordance with the change, and
   a dielectric protection sheet that protects a surface formed with the electrodes.

10. The input device as described in claim 9, wherein the first position detection unit includes:
    the detection section including an X-detecting electrode having a plurality of linear electrodes, which are aligned at regular intervals on a single surface and which extend in one direction,
    a common electrode having a plurality of linear electrodes, which are aligned at regular intervals between the respective linear electrodes of the X-detecting electrode on the surface formed with the X-detecting electrode and which extend in the extending direction of the linear electrodes of the X-detecting electrode, the common electrode applied with a pulse voltage, and
    a Y-detecting electrode having a plurality of linear electrodes, which are aligned at regular intervals on a surface parallel to and different from the surface formed with the X-detecting electrode and the common electrode and which extend in a direction perpendicular to the extending direction of the linear electrodes of the X-detecting electrode and the common electrode,
    detection processing unit that detects, for each of the linear electrodes of the X-detecting electrode and the Y-detecting electrode, a change in the pulse voltage applied to the X-detecting electrode and Y-detecting electrode by the common electrode through electrostatic coupling, and sends the input control unit an input signal in accordance with the change, and a dielectric protection sheet that protects one of the surfaces formed with the X-detecting electrode and the surface formed with the Y-detecting electrode, which is closer to the external space.

11. The input device as described in claim 10, wherein the detection processing unit of the first position detection unit, the detection processing unit of the second position detection unit, and the input control unit are integrated into an application specific integrated circuit.

12. The input device as described in claim 1, wherein the input control unit is configured to perform control of switching an input mode used in an input in the first position detection unit, on the basis of an input signal obtained through the detection of the operation tool by the second position detection unit.

13. The input device as described in claim 1, wherein the input control unit is configured to perform control of switching an input mode to a predetermined input mode selected from a plurality of input modes used in an input in the first position detection unit, on the basis of a particular input signal obtained from the second position detection unit by a particular input method using the operation tool, such as tapping input and long-press input.

14. The input device as described in claim 1, wherein the input control unit is configured to perform control of switching an input mode to a predetermined input mode selected from a plurality of input modes used in an input in the first position detection unit, on the basis of a complex input signal combining an input signal obtained from the detection section of the second position detection unit and an input signal obtained through the detection of a particular absolute position of the operation tool by the detection section of the first position detection unit.

15. The input device as described in claim 1, wherein the input control unit is configured to perform control of starting the operation of the first position detection unit after the detection of the operation tool by the second position detection unit.

16. The input device as described in claim 1, wherein the input control unit is configured to perform control of interrupting the operation of the first position detection unit during a time period in which the second position detection unit detects the operation tool after elapse of a predetermined time since completion of the detection of the operation tool by the first position detection unit.

17. The input device as described in claim 1, wherein the input control unit is formed separately from main control unit for comprehensively controlling an electronic device including, as one component, the input device.

18. The input device as described in claim 1, wherein the detection section of the first position detection unit forms input keys provided to a mobile terminal, and wherein the detection section of the second position detection unit is provided around or at sides of a region in which the input keys are provided.

19. The input device as described in claim 1, wherein the detection section of the second position detection unit is entirely encloses an outer circumference of the detection section of the first position detection unit.

* * * * *